E. SCHNEIDER.
MEANS FOR CONNECTING AND DISCONNECTING LARGE CALIBER GUN BARRELS TO AND FROM THEIR SLIDES.
APPLICATION FILED AUG. 6, 1917.

1,310,883.

Patented July 22, 1919.
7 SHEETS—SHEET 1.

E. SCHNEIDER.
MEANS FOR CONNECTING AND DISCONNECTING LARGE CALIBER GUN BARRELS TO AND FROM THEIR SLIDES.
APPLICATION FILED AUG. 6, 1917.

1,310,883.

Patented July 22, 1919.
7 SHEETS—SHEET 2.

E. SCHNEIDER.
MEANS FOR CONNECTING AND DISCONNECTING LARGE CALIBER GUN BARRELS TO AND FROM THEIR SLIDES.
APPLICATION FILED AUG. 6, 1917.

1,310,883.

Patented July 22, 1919.
7 SHEETS—SHEET 4.

Eugene Schneider,
By Mauro, Cameron, Lewis & Massie
Attorneys

E. SCHNEIDER.
MEANS FOR CONNECTING AND DISCONNECTING LARGE CALIBER GUN BARRELS TO AND FROM THEIR SLIDES.
APPLICATION FILED AUG. 6, 1917.

1,310,883.

Patented July 22, 1919.
7 SHEETS—SHEET 5.

E. SCHNEIDER.
MEANS FOR CONNECTING AND DISCONNECTING LARGE CALIBER GUN BARRELS TO AND FROM THEIR SLIDES.
APPLICATION FILED AUG. 6, 1917.

1,310,883.

Patented July 22, 1919.

E. SCHNEIDER.
MEANS FOR CONNECTING AND DISCONNECTING LARGE CALIBER GUN BARRELS TO AND FROM THEIR SLIDES.
APPLICATION FILED AUG. 6, 1917.
1,310,883.
Patented July 22, 1919.
7 SHEETS—SHEET 7.
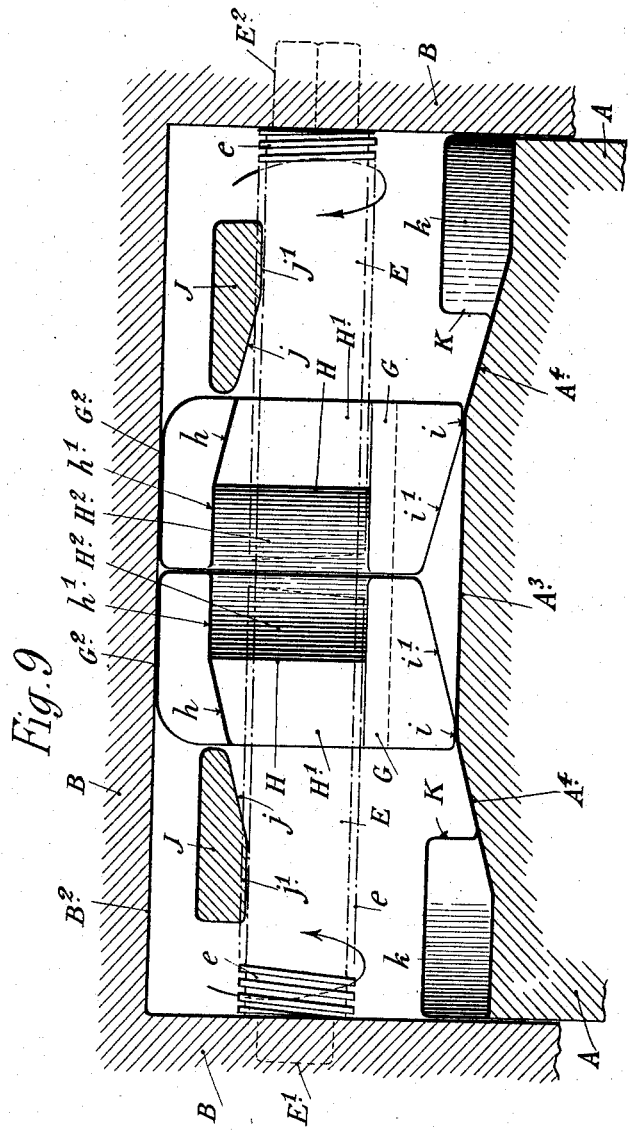

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT STOCK COMPANY OF FRANCE.

MEANS FOR CONNECTING AND DISCONNECTING LARGE-CALIBER GUN-BARRELS TO AND FROM THEIR SLIDES.

1,310,883.      Specification of Letters Patent.      Patented July 22, 1919.

Application filed August 6, 1917. Serial No. 184,650.

*To all whom it may concern:*

Be it known that I, EUGÈNE SCHNEIDER, a citizen of the French Republic, and a resident of Le Creuzot, Saône-et-Loire, France, have invented a new and useful Improvement in Means for Connecting and Disconnecting Large-Caliber Gun-Barrels to and from Their Slides, which invention is fully set forth in the following specification.

This invention has for its object to provide improved means for connecting and disconnecting a large caliber gun barrel to and from its slide.

The improved means consists essentially in a cross shaft journaled at both ends in the gun slide, and formed with opposite screw-threads along which two nuts can be caused to travel by the rotation of the said shaft produced by means of a key or any other suitable device, these two nuts being shaped in such a manner that by the coöperation between them and fore and aft lower projections on the gun barrel between which said nuts are moved, the following operations can be effected successively and alternately:

1. The gun barrel is moved forward, lowered and engaged with its slide for the purpose of locking the gun in place; and 2. The gun barrel is raised and at the same time disengaged from its slide and then moved back for the purpose of unlocking the gun barrel.

The hereinbefore described embodiment of this invention which is given solely by way of example, comprises in addition a safety device for preventing any untimely rotation of the screw-threaded cross shaft, and consequently any untimely shifting of the nuts.

In the accompanying drawings which illustrate this constructional example:—

In Fig. 6 the safety bolt is assumed to have been rotated through 90° from the position shown in Fig. 5.

Fig. 7 is a partial sectional elevation of the lower part of the gun barrel, showing more particularly the supporting and engaging projections and the bearing surfaces with which the gun barrel is provided.

Fig. 9 is a corresponding partial horizontal section on the line IX—IX of Fig. 8.

In these figures, A is the gun barrel, B is the gun slide, and C is a cradle of any suitable shape and construction journaled in a mount or gun carriage D.

Figure 1:
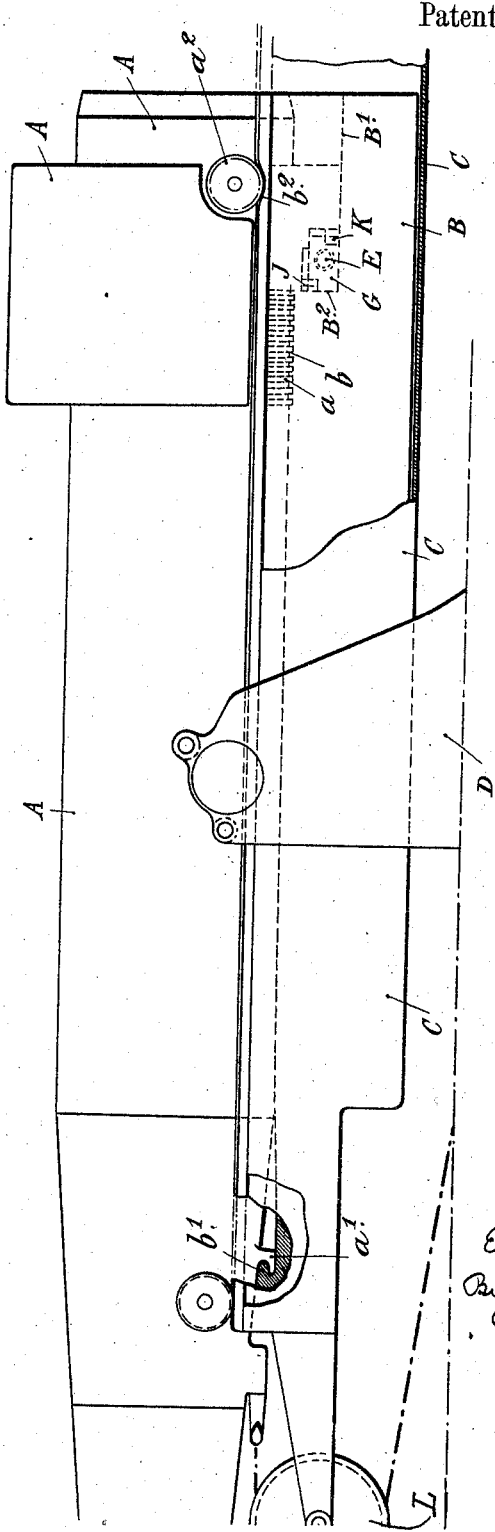
Figure 1 is a side elevation of the gun barrel with its slide showing the application of the present invention.
Figure 2:
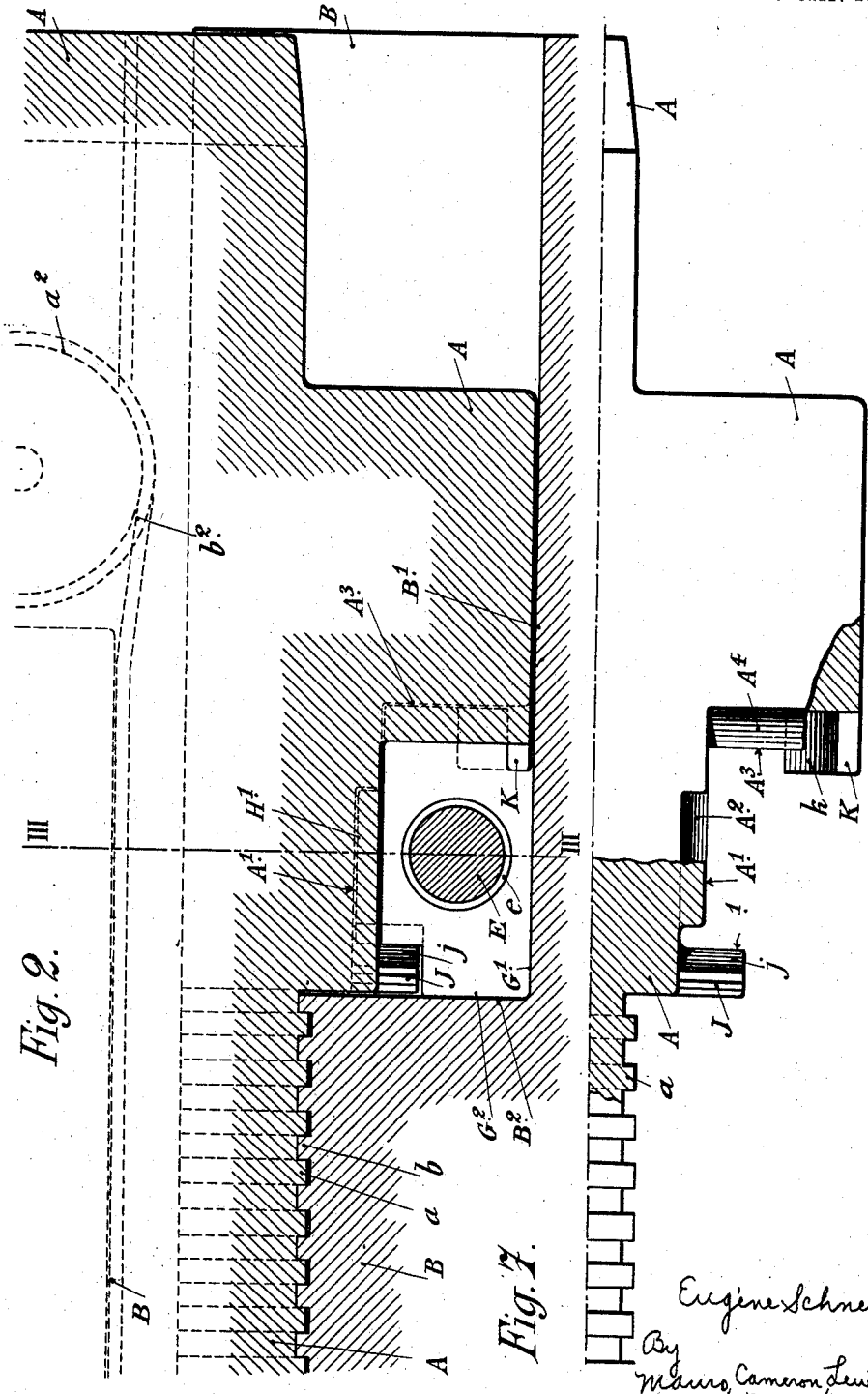
Fig. 2 is a longitudinal section taken along the axis of the gun barrel showing the gun barrel engaged with its slide.

The means for connecting the gun barrel A to its slide B may comprise in the usual manner a series of ribs $a$ formed on the gun barrel, adapted to engage with corresponding groves $b$ formed in the slide, in combination with a hook $a^1$ on the gun barrel (Fig. 1) engaging in a socket $b^1$ or counter-hook formed on the fore part of the slide. This known latter fastening may be supplemented by the engagement of rollers $a^2$ carried by the gun barrel in recesses $b^2$ formed in the slide.

The improved means forming the subject matter of this invention has for its object to effect rapidly and conveniently the connection of the gun barrel with its slide, while insuring a firm support for the gun. It also has for its object to allow of undoing the connection between the gun barrel and its slide by a simple and rapid operation requiring only a minimum of effort.

The improved means comprises a cross shaft E journaled at its two ends in the gun slide B. In the example shown, one of the ends $E^1$ is journaled directly in the slide or in a removable plug of any suitable shape. The other end $E^2$ is journaled in a bearing F of peculiar construction screwed in the slide. When the slide is run out into position for firing the gun, the said bearing comes opposite an aperture $C^1$ in the slide through which an operating key can be introduced and removed.

The shaft E is formed on the two sides of the longitudinal axial plane of the slide, with two opposite screw-threads $e, e$. G are nuts working on these screw-threads. These nuts are arranged to be moved away from and toward each other according to the direction of the rotation imparted to the shaft E. For this purpose these nuts are formed with a flat lower supporting face $G^1$ bearing upon the flat bottom $B^1$ of the slide. The nuts also have a forward vertical flat face $G^2$ bearing upon the bottom $B^2$ of a lodgment in the slide.

These nuts have each an upper boss H and a rear lateral boss I. These bosses are shaped to serve as supports to bearing surfaces formed on the gun barrel, in such a manner that by the coöperation between these bosses and fore and aft lower projections or stops J and K respectively of the gun barrel between which the nuts are adapted to move, the movements necessary for connecting and disconnecting the gun barrel to and from its slide are produced alternately.

Figure 8:
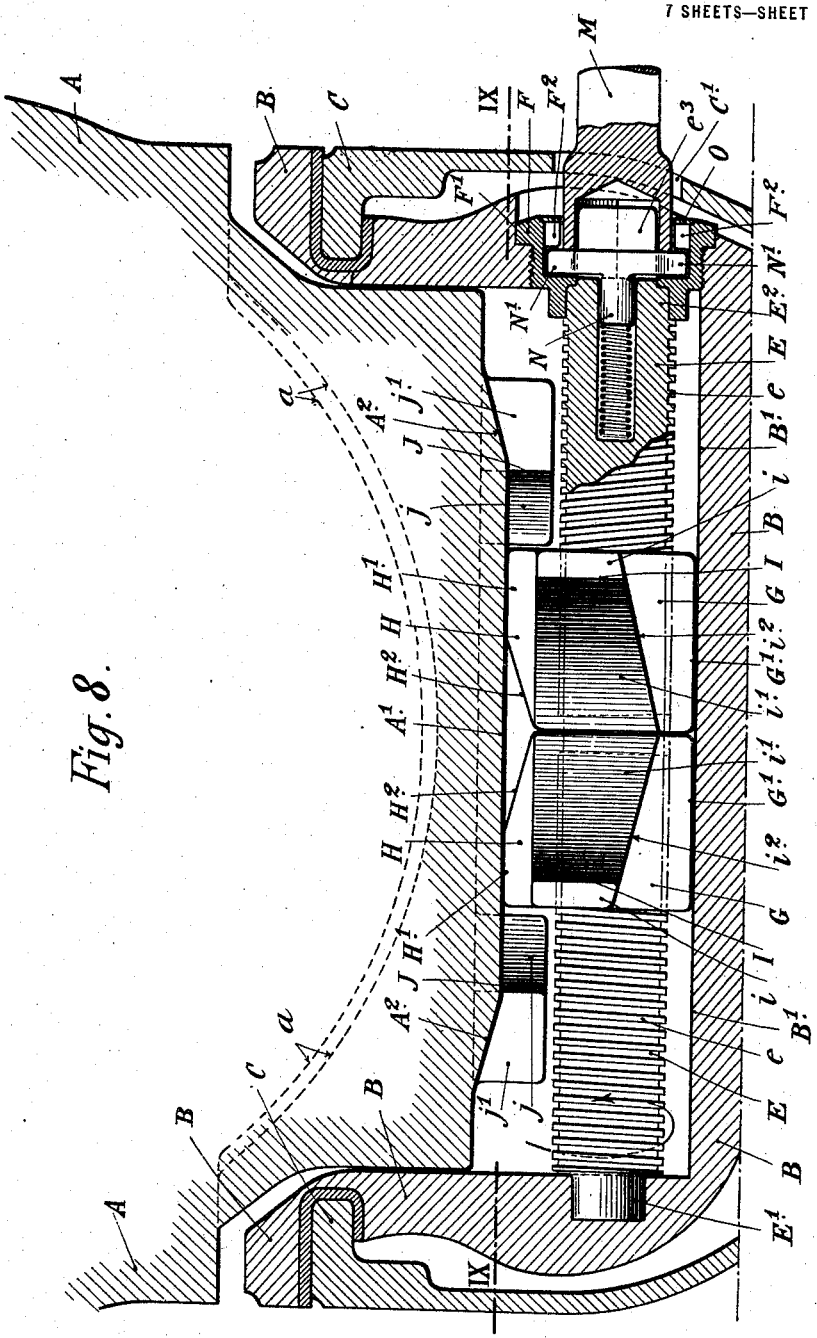
Fig. 8 is a vertical cross section similar to Fig. 3, showing the gun barrel in position on the nuts at the beginning of the connecting operation.

To effect the connection of the gun barrel with its slide, the gun barrel is brought on to the slide by means of the windlass L into the desired position such that the lower horizontal supporting surface $A^1$ shall bear as shown in Fig. 8, upon the flat faces $H^1$ of the bosses H of the nuts, and that the rear supporting surfaces $A^3$ shall abut against the vertical faces $i$ of the bosses I (Fig. 9). The gun barrel is thus held in a super-elevated position by its rollers resting on the slide, at a height corresponding to the depth of the groove $b$, and behind its position of connection.

The projections J are formed under the gun barrel at a suitable distance apart, so as to be located one on each side of the nuts when the latter are close up together.

Then by operating the shaft E in the direction of the arrows (Figs. 8 and 9), the nuts will move away from each other without rotating. The forward oblique faces $h$ of the bosses H will bear against the similarly inclined oblique projections $j$ of the gun barrel, this being the case as soon as the bearing surfaces $i$ formed at right angles to the axis of the gun barrel on the bosses I, have moved away from the supporting surface $A^3$.

Owing to this support between the faces $h$ and $j$, the gun barrel will be moved forward by the thrust of the nuts. When, by the separating movement of the nuts, the faces $h$ move away from the faces $j$ of the projections J, the inclined faces $H^2$ of the upper bosses H will come opposite to the correspondingly inclined bearing surfaces $A^2$ of the gun barrel, and thus allow the latter to move down. The ribs $a$ on the gun barrel are on a level with the grooves $b$ of the slide. The hook $a^1$ is engaged in the socket $b^1$, and the rollers $a^2$ are on a level with the recesses $b^2$. The gun barrel moves down by its own weight aided by the pressure exerted by the rear bosses I, by means of their inclined faces $i^2$, upon the similarly inclined faces $k$ of the rear projection K of the gun barrel.

Figure 3:
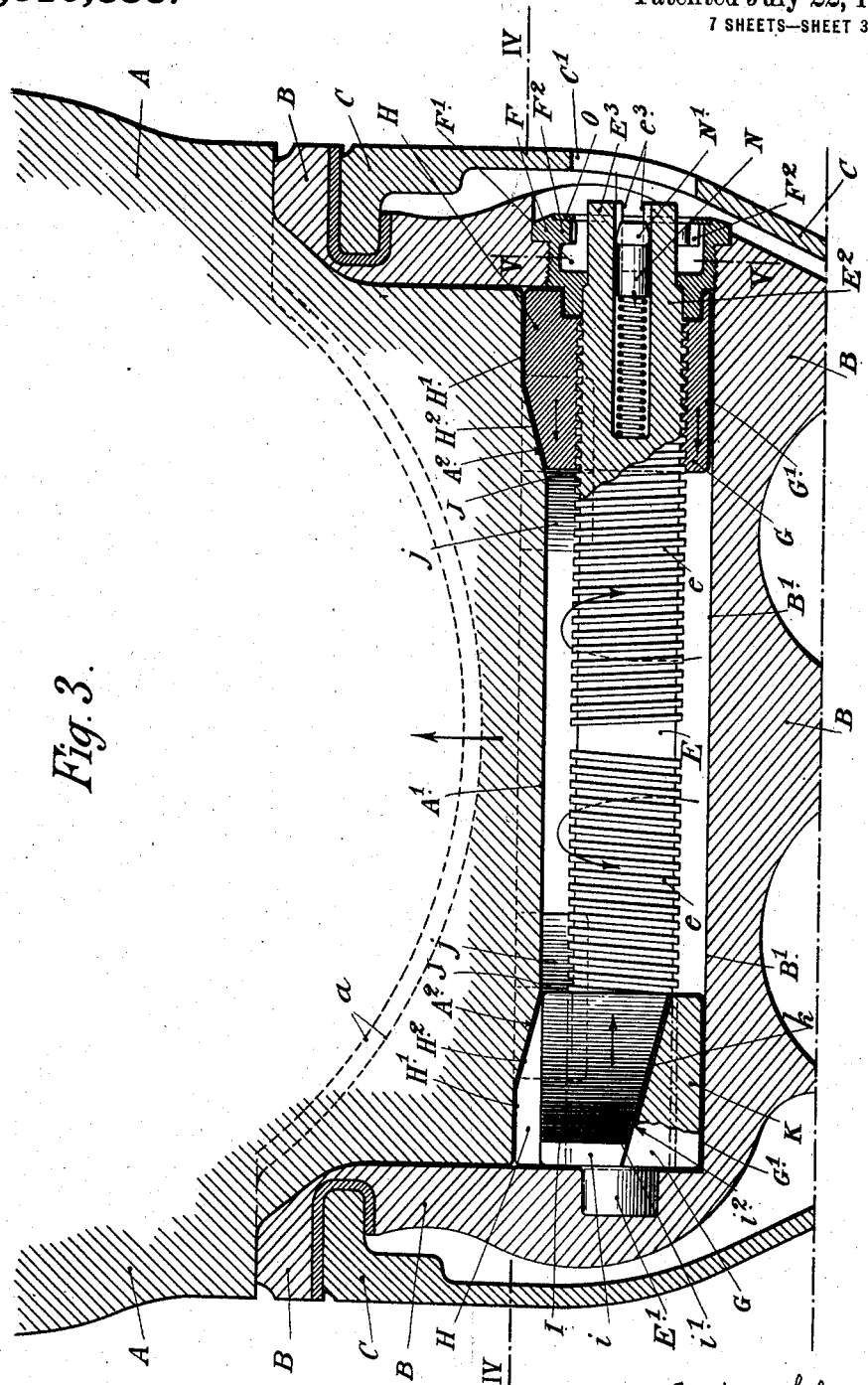
Fig. 3 is a cross section on the line III—III of Fig. 2.
Figure 4:
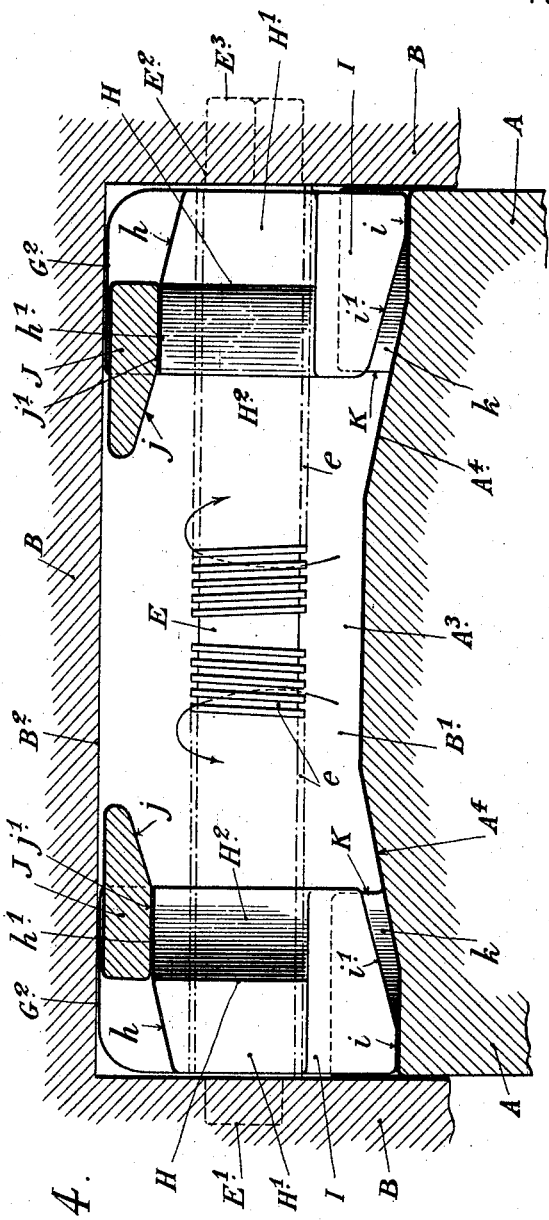
Fig. 4 is a partial horizontal section on the line IV—IV of Fig. 3.

The parts assume finally the positions shown in Figs. 3 and 4 where the nuts have been moved the maximum distance apart and engage by means of their bosses between the projections J—J and K—K of the gun barrel.

Inversely, if on starting from a position of connection, it is desired to disconect the gun barrel from its slide, it is sufficient to rotate the shaft E in the opposite direction (the direction of the arrows shown in Figs. 3 and 4). In this manner the nuts are moved toward each other parallel to themselves.

In this movement the upper bosses H produce in the first place by their inclined faces $H^2$ sliding over the supporting surfaces $A^2$ of the gun barrel, a rising movement of the gun barrel equal to the height of the ribs $a$.

At the end of this rising movement, the gun barrel rests again with its supporting surfaces $A^1$ upon the horizontal flat bearing surfaces $H^1$ of the bosses H.

As soon as the inclines $H^2$ have moved away from the corresponding inclines $A^2$ of the gun barrel, the inclined faces $i^1$ of the bosses I, in moving parallel to themselves, push the gun barrel rearward, by abutting against the similarly inclined supporting surfaces $A^4$ of the gun barrel, and until the parts have resumed the positions shown in Figs. 8 and 9.

The shaft E may be operated by means of an ordinary key M, such as that shown in Fig. 8, adapted to engage with a six-sided head $E^3$ formed on a projecting portion of the journal $E^2$.

In the constructional example shown, this invention comprises a safety device for preventing any untimely rotation of the screw-threaded shaft E. This safety device is illustrated more particularly in Figs. 3, 5, 6 and 8.

The nut F that forms a bearing for the journal $E^2$, comprises a chamber $F^1$ corresponding in radius and in height to the length and thickness of the arms $N^1$ of a spring bolt, the stem N and spring of which are located in a recess in the shaft E. These arms $N^1$ are adapted to slide in grooves $e^3$ formed in the head $E^3$.

In front of the chamber $F^1$, the nut has projections $F^2$ corresponding in depth to the thickness of the arms $N^1$. Normally, the arms $N^1$ are engaged in the gaps $F^3$ between the said projections, and the bolt is prevented from moving out by a washer O fixed to the nut.

Figure 5:
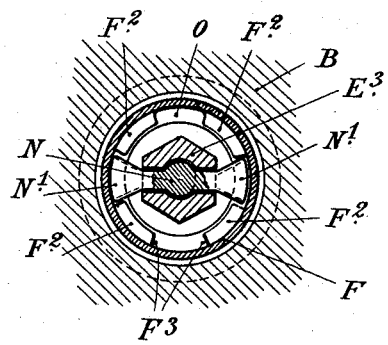
Fig. 5 is a partial section on the line V—V of Fig. 3.
Figure 6:
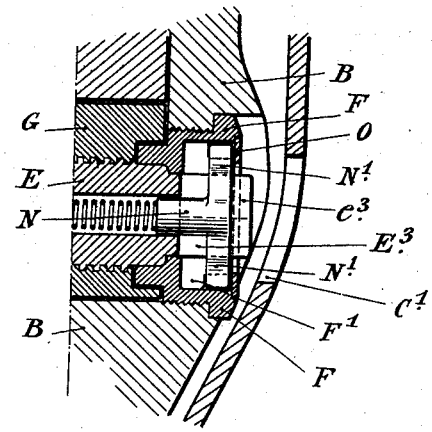
Fig. 6 is a partial section along the axis of the screw-threaded shaft.
Figure 10:
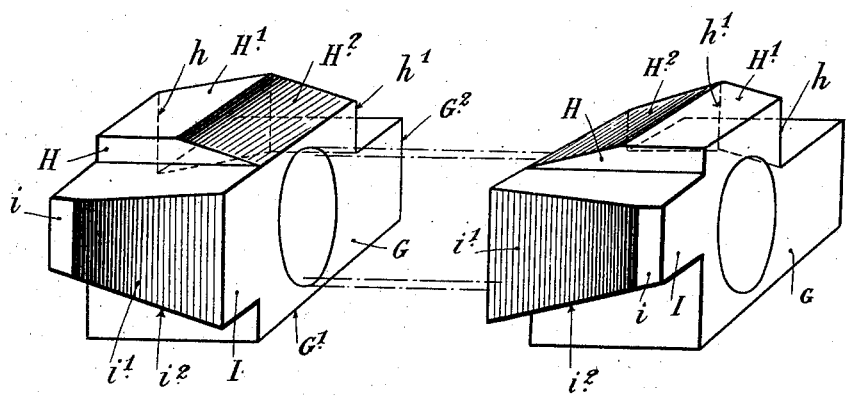
Fig. 10 is a perspective view of the two nuts in their relative position to each other.

The ends of the arms $N^1$ are thus imprisoned between two projections $F^2$, as shown in Figs. 3, 5 and 6, so that any rotation of the shaft E is thereby prevented.

When it is desired to rotate the shaft E, the bolt is pushed inward by means of the key M, whereby the arms $N^1$ are brought into the chamber $F^1$ wherein they are able to rotate freely (Fig. 8).

What I claim is:—

1. In means for connecting and disconnecting a large caliber gun barrel to and from its slide, the combination with said slide, of supporting surfaces on said gun barrel, fore and aft depending stops on said gun barrel, a cross shaft journaled at both ends in said slide, having two opposite screw-threads and two nuts capable of axial, but not of rotational motion, engaging respectively with said screw-threads, having upper bosses for coöperating with said supporting gun surfaces, and lateral bosses for coöperating with said fore and aft stops, whereby by rotating said cross shaft in one direction so as to move said nuts away from each other, the gun barrel is moved forward, lowered and engaged with its cradle, while by rotating said cross shaft in the opposite direction so as to move the nuts toward each other, the gun barrel is raised, moved back and disengaged from its cradle.

2. In means for connecting and disconnecting a large caliber gun barrel to and from its slide, the combination with said slide, of supporting surfaces on said gun barrel, fore and aft depending stops on said gun barrel, a cross shaft journaled at both ends in said slide, having two opposite screw-threads and two nuts capable of axial, but not of rotational motion, engaging respectively with said screw-threads, having upper bosses for coöperating with said supporting gun surfaces, and lateral bosses for coöperating with said fore and aft stops, and a safety device for preventing any untimely rotation of said cross shaft, comprising a stop formed on said slide, concentric to said cross shaft, a locking member with a head thereon located axially in relation to said cross shaft, and a spring having a constant tendency to keep the head of said locking member in engagement with said stop, whereby said cross shaft is prevented from rotating so long as said head is engaged with said stop, but can be rotated when said head is pushed back out of engagement with said stop by means of a rotating key in opposition to the action of said spring.

In testimony whereof I have signed this specification.

EUGÈNE SCHNEIDER.

Copies of this patent may be obtained for five cents each, by addressing the "Commissioner of Patents, Washington, D. C."